United States Patent
Abe

(10) Patent No.: US 9,596,365 B2
(45) Date of Patent: Mar. 14, 2017

(54) CONTROLLING APPARATUS FOR SETTING SSID IN UNSET DEVICE

(71) Applicant: Brother Kogyo Kabushiki Kaisha, Nagoya-shi, Aichi-ken (JP)

(72) Inventor: Akiko Abe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/868,483

(22) Filed: Sep. 29, 2015

(65) Prior Publication Data

US 2016/0094726 A1 Mar. 31, 2016

(30) Foreign Application Priority Data

Sep. 29, 2014 (JP) ................................. 2014-198164

(51) Int. Cl.
*G06F 3/12* (2006.01)
*H04N 1/00* (2006.01)
*H04W 48/16* (2009.01)
*H04W 12/00* (2009.01)

(52) U.S. Cl.
CPC ..... *H04N 1/00103* (2013.01); *H04N 1/00204* (2013.01); *H04W 48/16* (2013.01); *H04N 2201/0055* (2013.01); *H04N 2201/0094* (2013.01); *H04W 12/00* (2013.01)

(58) Field of Classification Search
CPC ........... H04N 1/00103; H04N 1/00204; H04N 2201/0055; H04N 2201/0094; H04W 48/16; H04W 4/008; H04L 41/0806; H04L 63/0428; H04L 63/1416

USPC ...... 358/1.9, 0.13, 1.14, 1.15, 402; 709/224; 370/338; 455/41.1; 380/255; 726/4; 713/168

See application file for complete search history.

(56) References Cited

U.S. PATENT DOCUMENTS

| | | | |
|---|---|---|---|
| 8,457,085 B2 | 6/2013 | Izaki | |
| 9,078,137 B1 * | 7/2015 | Chechani | H04W 12/08 |
| 9,241,281 B2 * | 1/2016 | Pulini | H04W 84/18 |
| 2008/0062919 A1 * | 3/2008 | Chen | H04W 16/14 370/329 |
| 2008/0298450 A1 * | 12/2008 | Zhang | H04L 1/0006 375/227 |
| 2009/0046686 A1 | 2/2009 | Izaki | |

(Continued)

FOREIGN PATENT DOCUMENTS

JP 2009-044701 A 2/2009

*Primary Examiner* — Gabriel Garcia
(74) *Attorney, Agent, or Firm* — Banner & Witcoff, Ltd.

(57) ABSTRACT

The controlling apparatus may search for one or more access points so as to obtain N items of wireless identifiers, in a case where a first wireless network to which a set device belongs is a first type of wireless network in which a carrier wave having a first frequency is used. A first wireless identifier has been set in the set device and an unset device is a first type of device which is not capable of using the carrier wave having the first frequency. The controlling apparatus may obtain, from a memory of the set device, the first wireless identifier for identifying the first wireless network, select, based on the first wireless identifier, a second wireless identifier from among one or more wireless identifiers included in the N items of wireless identifiers, and execute a first setting process for setting the second wireless identifier in the unset device.

10 Claims, 10 Drawing Sheets

(56) References Cited

U.S. PATENT DOCUMENTS

| | | | | |
|---|---|---|---|---|
| 2012/0224569 A1* | 9/2012 | Kubota | ................ | H04W 84/20 370/338 |
| 2013/0260683 A1* | 10/2013 | Suzuki | ................ | H04W 4/008 455/41.1 |
| 2016/0007200 A1* | 1/2016 | Shibata | ................ | H04W 12/08 713/168 |

* cited by examiner

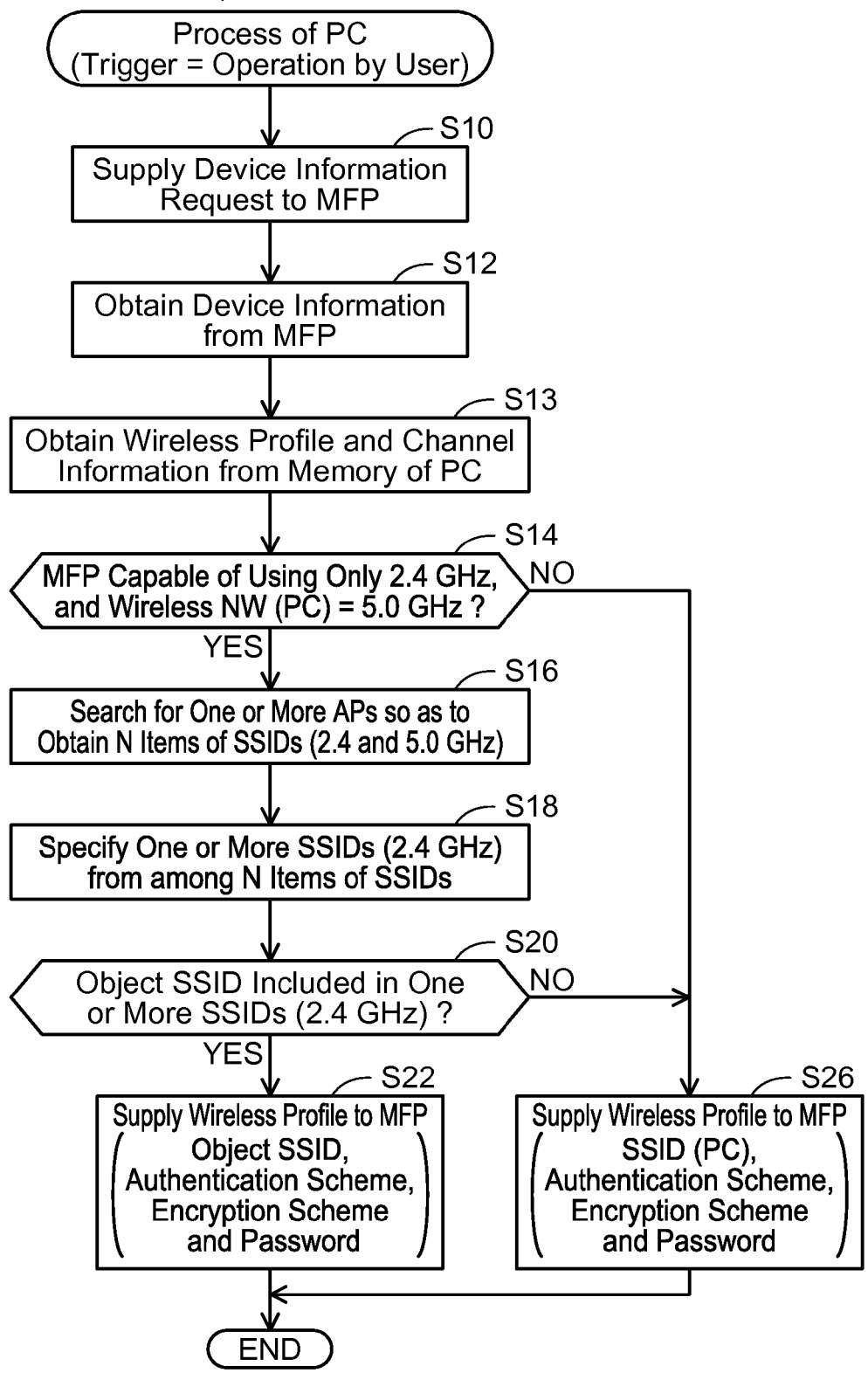

FIG. 3

| Conditions | Contents | Examples | |
|---|---|---|---|
| | | SSID (2.4 GHz) | SSID (PC) |
| 1 | Entire (YYY) of SSID (2.4 GHz) is Identical to Entire (YYY) of SSID (PC) | YYY | YYY |
| 2 | Entire (YYY) of SSID (2.4 GHz) is Identical to Character String (YYY) of SSID (PC) Except for Last Four Characters, and Last Four Characters of SSID (PC) Include "5G" | YYY | YYY5GHz |
| 3 | Entire (ZZZ) of SSID (2.4 GHz) is Identical to Character String (ZZZ) of SSID (PC) Except for Last Three Characters, and Last Three Characters of SSID (PC) Include "5G" | ZZZ | ZZZ-5G |
| | | WWW | WWW_5G |
| 4 | Entire (VVV) of SSID (2.4 GHz) is Identical to Character String (VVV) of SSID (PC) Except for Last Two Characters, and Last Two Characters of SSID (PC) Include "A" | VVV | VVV-A |
| 5 | Only One Character is Different Between SSID (2.4 GHz) and SSID (PC), Different Character of SSID (2.4 GHz) is "G", and Different Character of SSID (PC) is "A" | U-G-U | U-A-U |
| | | TTT-G | TTT-A |

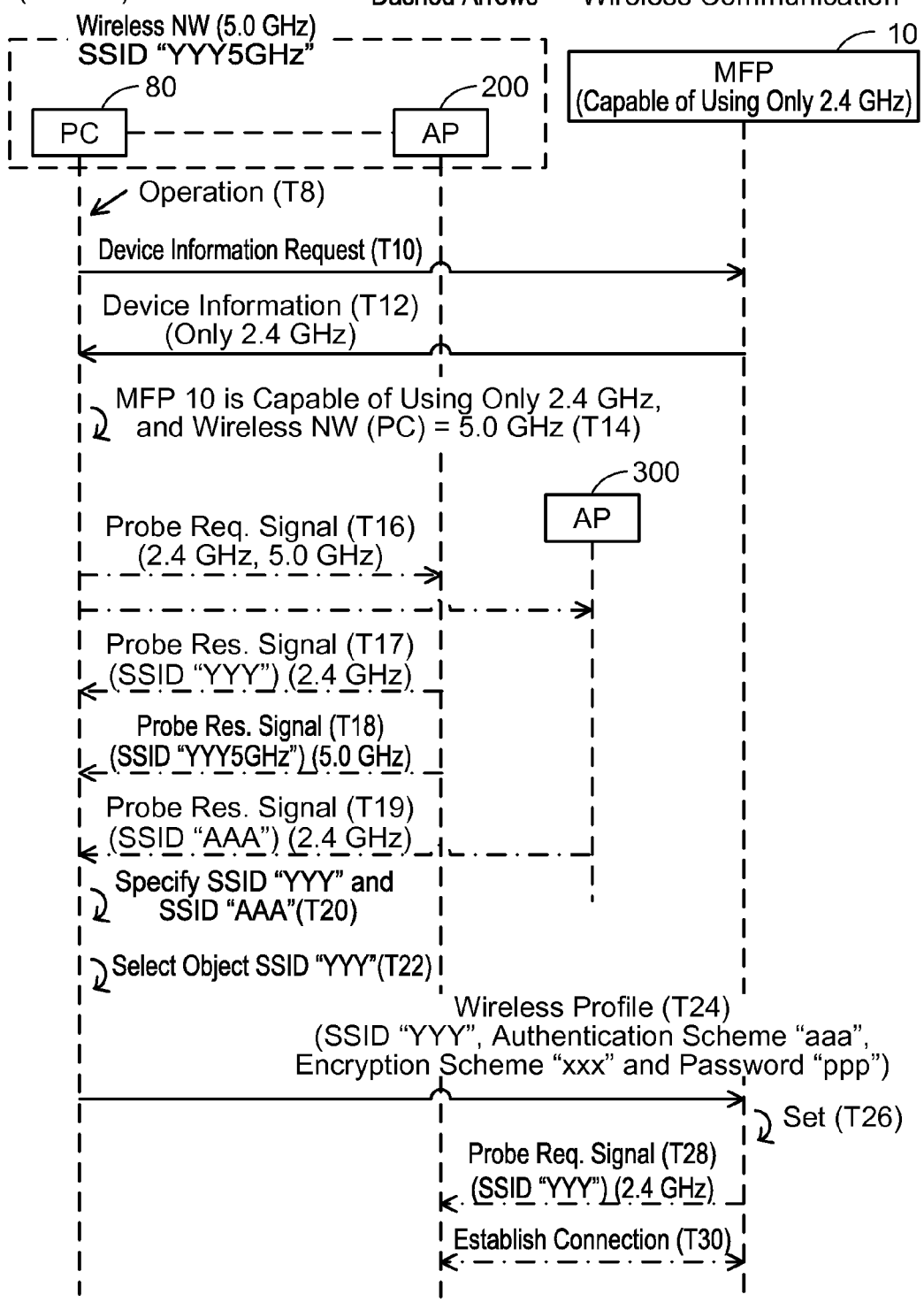

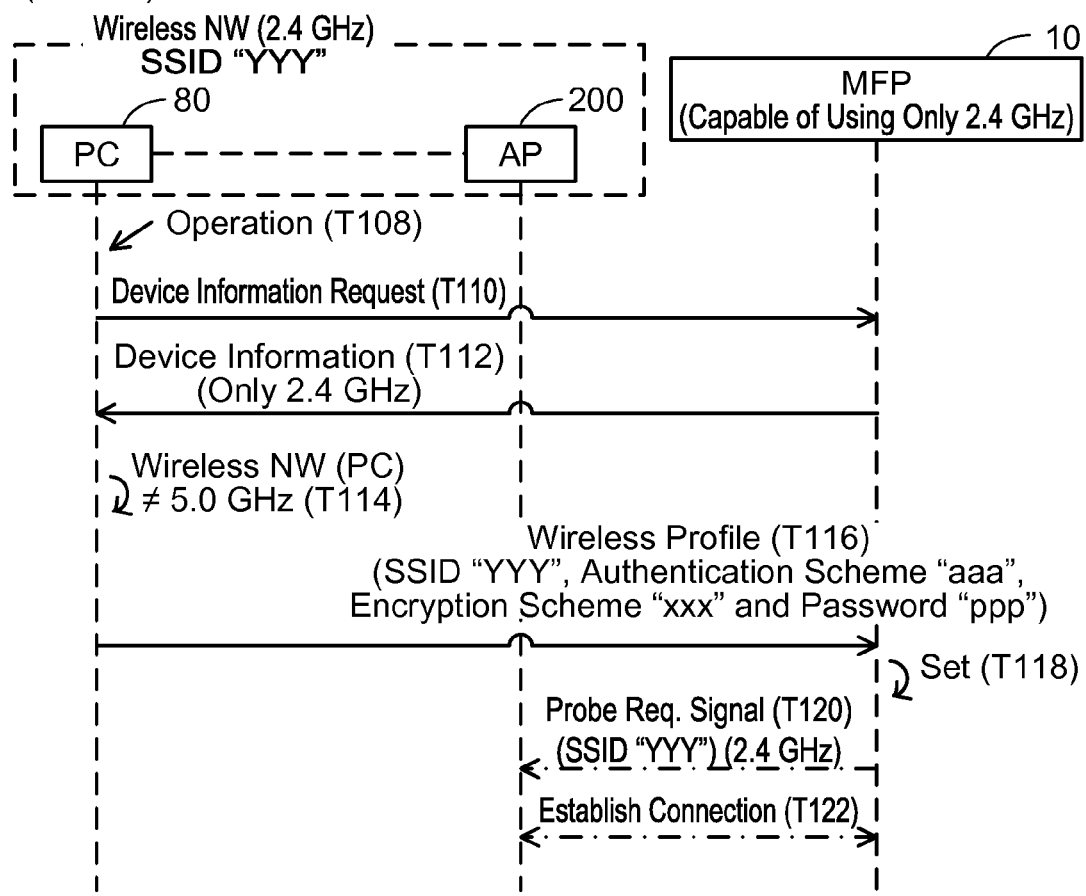

(Case C)

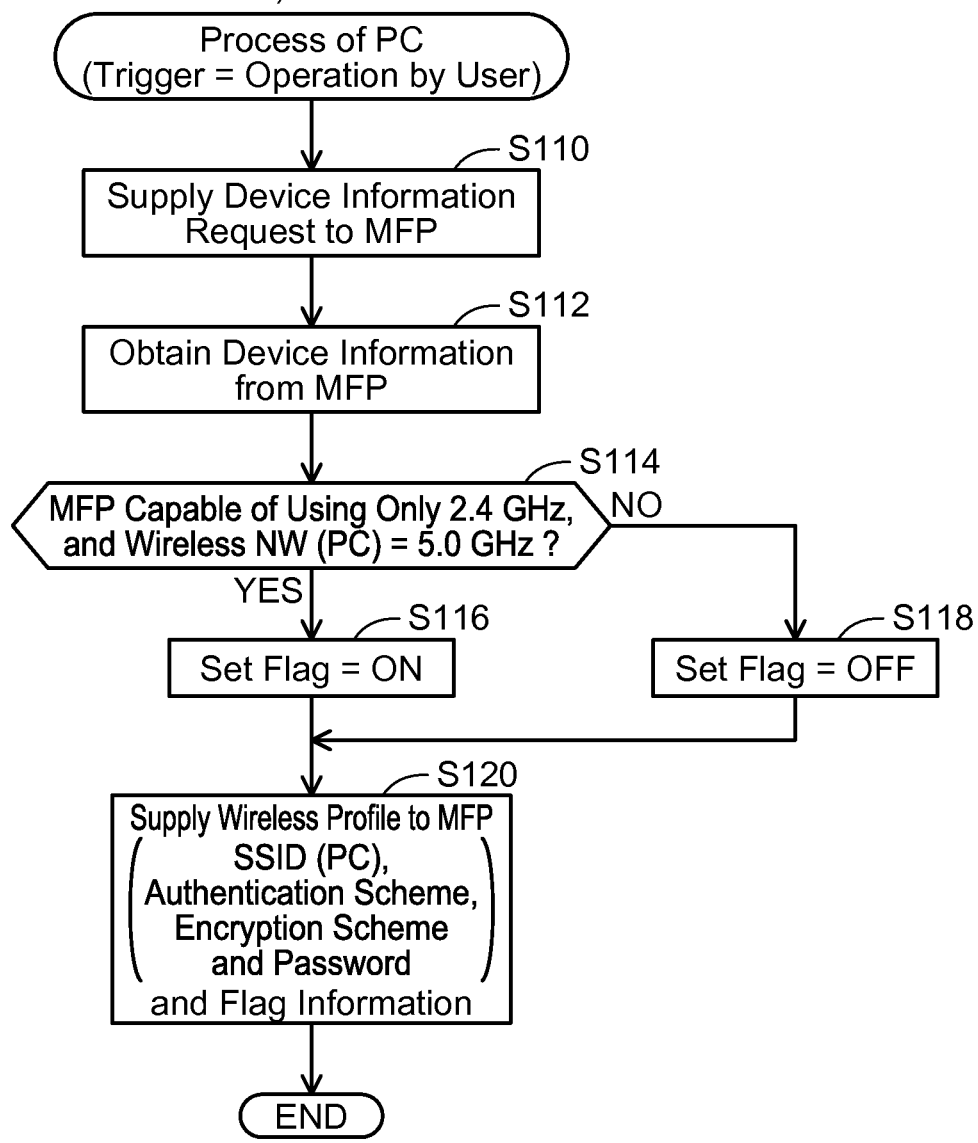

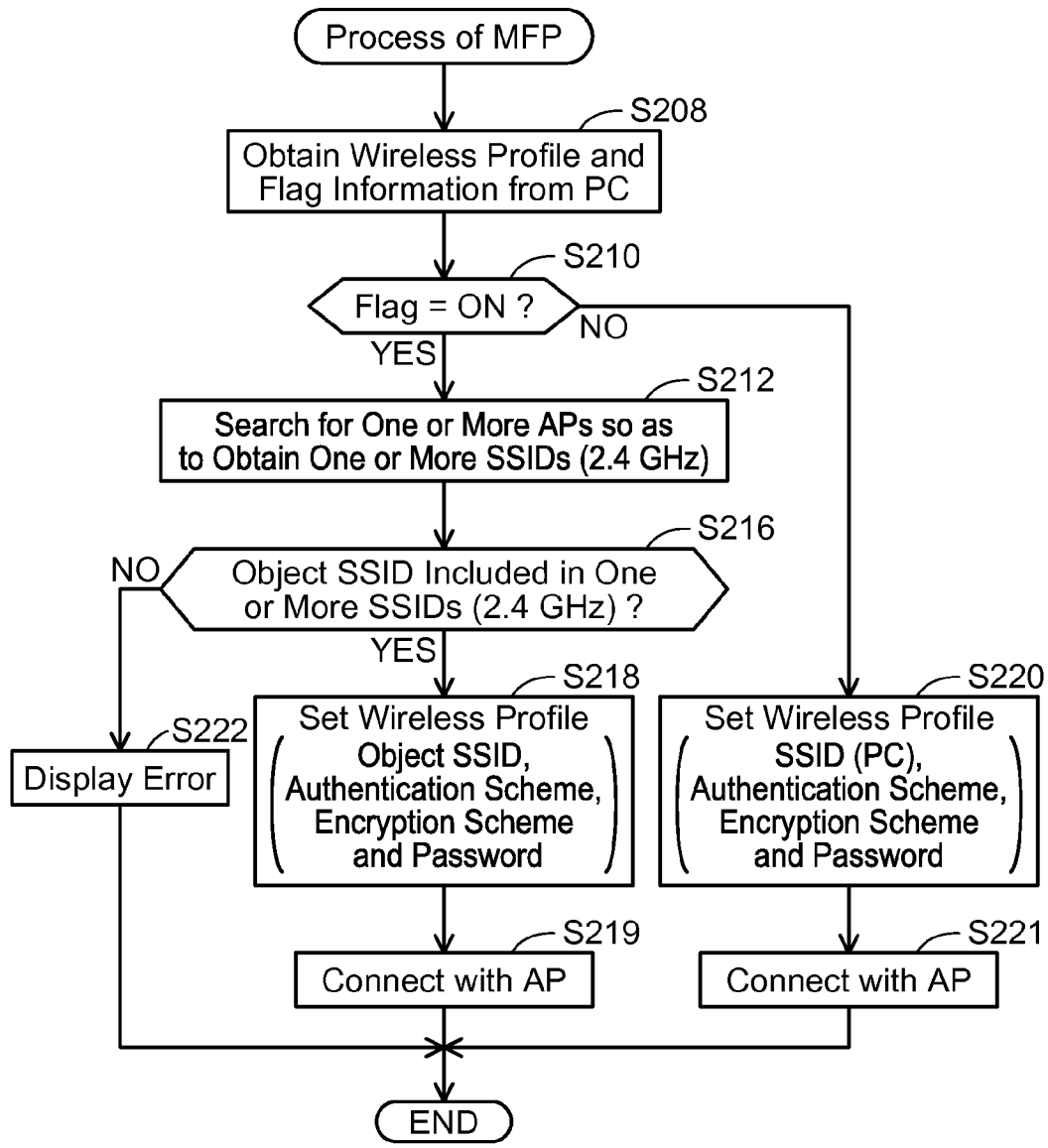

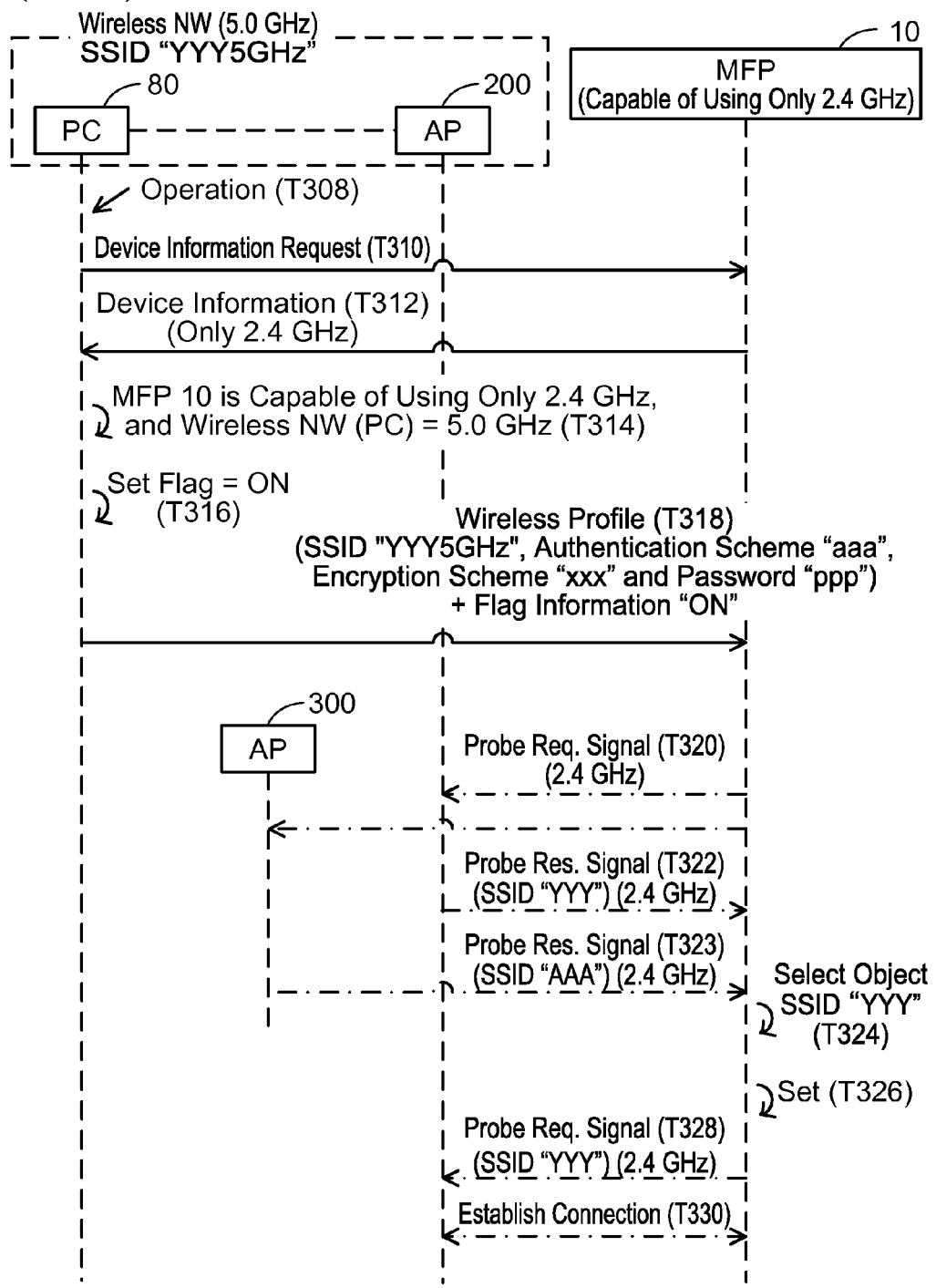

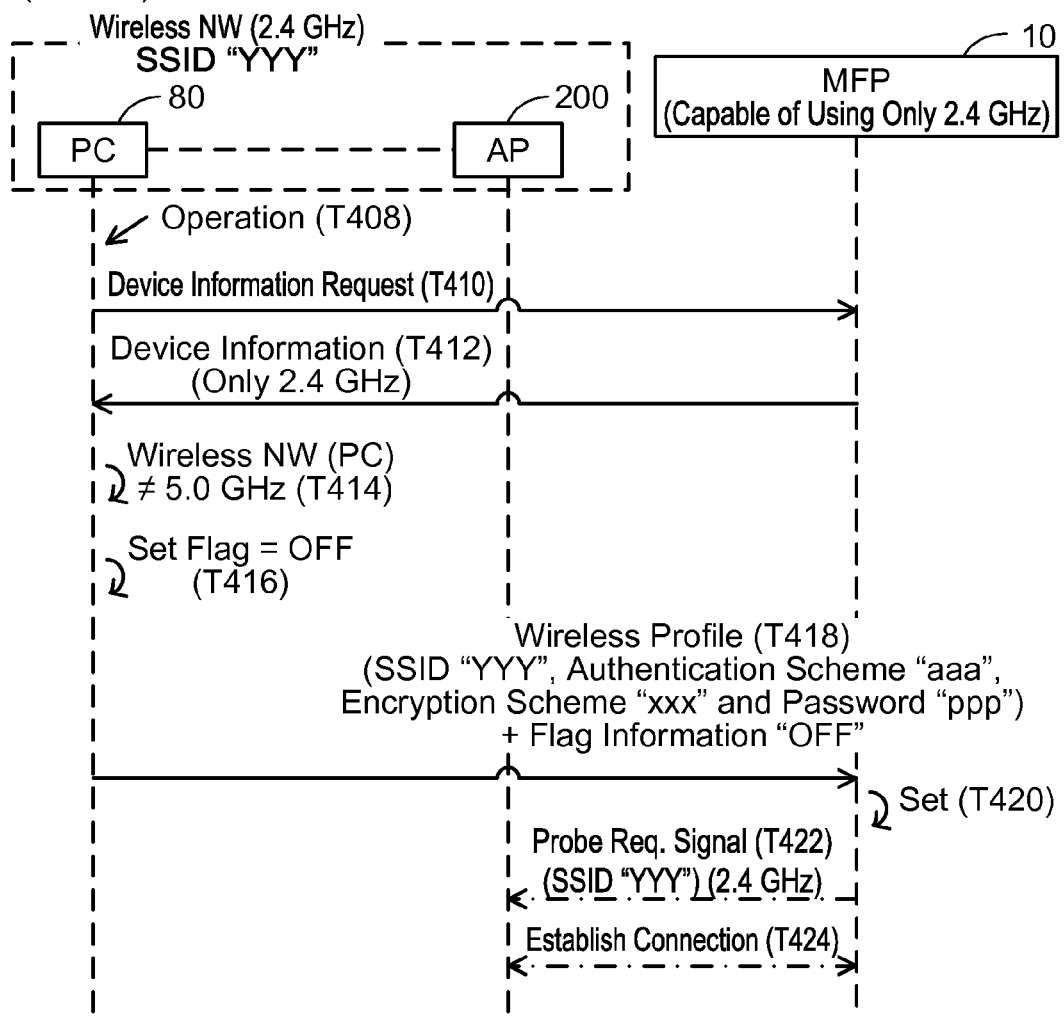

US 9,596,365 B2

CONTROLLING APPARATUS FOR SETTING SSID IN UNSET DEVICE

CROSS-REFERENCE TO RELATED APPLICATIONS

This application claims priority to Japanese Patent Application No. 2014-198164, filed on Sep. 29, 2014, the contents of which are hereby incorporated by reference into the present application.

TECHNICAL FIELD

The present specification discloses a technique for controlling an unset device in which a wireless identifier for identifying a wireless network has not been set.

DESCRIPTION OF RELATED ART

The following technique, in which a printer supplies a network wireless setting to another printer, is known. A first printer is connected with a wireless communication network formed by an access point (called "AP" below). A second printer is not connected with a wireless communication network. The first printer and the second printer store the same ad-hoc wireless setting. The first printer sends a network wireless setting to be used in the wireless communication network to the second printer according to the ad-hoc wireless setting.

SUMMARY

In the above technique, in a case where the second printer is not capable of using the network wireless setting received from the first printer, the second printer cannot connect with the wireless communication network, and therefore cannot execute a wireless communication by using the wireless communication network. In the present specification, a technique is provided which may cause an unset device to appropriately execute a wireless communication using a wireless network.

One aspect disclosed in the present specification may be a controlling apparatus for controlling an unset device in which a wireless identifier for identifying a wireless network has not been set. The controlling apparatus may comprise: a processor; and a memory storing computer-readable instructions therein, the computer-readable instructions, when executed by the processor, causing the controlling apparatus to perform: searching for one or more access points located in a surrounding of the controlling apparatus so as to obtain N items (the N being an integer equal to or more than 1) of wireless identifiers used by the one or more access points, in a case where a first wireless network to which a set device belongs is a first type of wireless network and the unset device is a first type of device, a first wireless identifier having been set in the set device, the first type of network being a wireless network in which a carrier wave having a first frequency is used, and the first type of device being not capable of using the carrier wave having the first frequency and being capable of using a carrier wave having a second frequency different from the first frequency; obtaining, from a memory of the set device, the first wireless identifier for identifying the first wireless network to which the set device belongs; selecting, based on the first wireless identifier, a second wireless identifier from among one or more wireless identifiers included in the N items of wireless identifiers, each of the one or more wireless identifiers being for identifying a second type of network in which the carrier wave having the second frequency is used; and executing a first setting process for setting the second wireless identifier in the unset device in order to cause the unset device to belong to a second wireless network being identified by the second wireless identifier, in a case where the second wireless identifier is selected.

Moreover, a control method, a computer program including computer-readable instructions, and a non-transitory computer-readable storage medium that stores the computer-readable instructions, all for realizing the controlling apparatus, are also novel and useful. Further, a communication system comprising the controlling apparatus and at least one apparatus (e.g. unset device and set device) is also novel and useful.

BRIEF DESCRIPTION OF THE DRAWINGS

FIG. 2 shows a flowchart of a process executed by a PC of a first embodiment;
FIG. 3 shows conditions for selecting an object SSID;
FIG. 4 shows a sequence view of a case A in which the PC selects an object SSID;
FIG. 5 shows a sequence view of a case B in which the PC does not select an object SSID;
FIG. 7 shows a flowchart of a process executed by a PC of a second embodiment;
FIG. 8 shows a flowchart of a process executed by a multi-function peripheral of the second embodiment;
FIG. 9 shows a sequence view of a case D in which the MFP selects an object SSID;
and
FIG. 10 shows a sequence view of a case E in which the MFP does not select an object SSID.

EMBODIMENTS

First Embodiment

Figure 1:
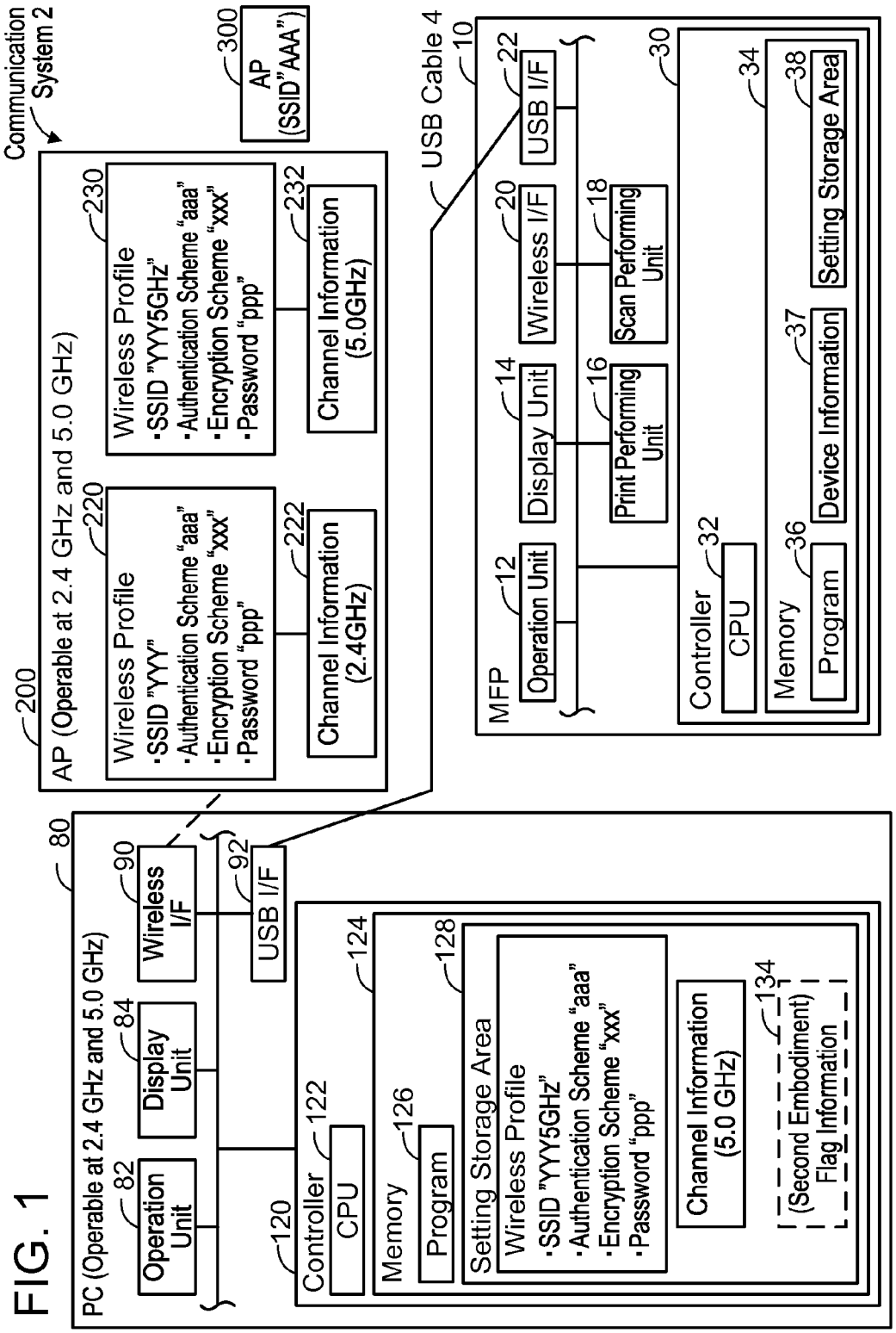
FIG. 1 shows a configuration of a communication system.

Configuration of Communication System 2; FIG. 1

A communication system 2 comprises a multi-function peripheral 10, a PC (abbreviation of Personal Computer) 80, and a plurality of access points 200, 300. Below, the multi-function peripheral 10 is described as an MFP (abbreviation of Multi-Function Peripheral) 10, and the access points 200, 300 are referred to as APs (abbreviation of Access Point) 200, 300. The MFP 10 and the PC 80 are capable of executing a wired communication via a USB (abbreviation of Universal Serial Bus) cable 4. The MFP 10 is a device that does not currently belong to any wireless network formed by the APs 200, 300, and is to belong to a wireless network. The PC 80 is a device currently belonging to a wireless network formed by the AP 200.

(Configuration of Multi-Function Peripheral 10)

The MFP 10 is a peripheral apparatus (i.e., a peripheral apparatus of the PC 80, or the like) capable of executing multiple functions including a print function and a scan function. The MFP 10 comprises an operation unit 12, a display unit 14, a print performing unit 16, a scan performing unit 18, a wireless interface 20, a USB interface 22, and a controller 30. Below, interface is referred to as an "I/F".

The operation unit 12 is configured by a plurality of keys. A user can input various instructions to the MFP 10 by operating the operation unit 12. The display unit 14 is a display for showing various types of information. The print performing unit 16 employs a printing mechanism such as an ink jet method, laser method, etc. The scan performing unit 18 employs a scanning mechanism such as a CCD, CIS, etc.

The network I/F 20 is a wireless I/F for executing a wireless communication in accordance with the Wi-Fi scheme. The Wi-Fi scheme is a wireless communication scheme for executing a wireless communication in accordance with, e.g., IEEE (abbreviation of The Institute of Electrical and Electronics Engineers, Inc.) standard 802.11 or standards conforming thereto (e.g., 802.11a, 11b, 11g, 11n, etc.). The controller 30 can execute a wireless communication via the wireless I/F 20 by using a wireless network (called "wireless NW" below) formed by an AP (e.g., 200).

In wireless NWs, a carrier wave having a frequency of 2.4 GHz, or a carrier wave having a frequency of 5.0 GHz, are typically used. The frequency of the carrier wave to be used in the wireless NW is determined by the AP that forms the wireless NW. Below, a wireless NW in which a carrier wave having a frequency of 2.4 GHz is used, and a wireless NW in which a carrier wave having a frequency of 5.0 GHz is used, may be referred to as "wireless NW (2.4 GHz)" and "wireless NW (5.0 GHz)", respectively. The wireless I/F 20 may be an I/F which supports both the 2.4 GHz frequency and the 5.0 GHz frequency, or may be an I/F which supports only the 2.4 GHz frequency. That is, the MFP 10 may be capable of using both a carrier wave having a frequency of 2.4 GHz and a carrier wave having a frequency of 5.0 GHz, or may be capable of using only a carrier wave having a frequency of 2.4 GHz (i.e., not capable of using a carrier wave having a frequency of 5.0 GHz).

One end of the USB cable 4 is connected with the USB I/F 22. An other end of the USB cable 4 is connected with the PC 80. The controller 30 can execute a USB communication with the PC 80 via the USB I/F 22.

The controller 30 comprises a CPU 32 and a memory 34. The CPU 32 is a processor which performs various processes in accordance with a program 36 stored in the memory 34. The memory 34 is configured by a RAM, ROM, etc. The memory 34 stores not only the program 36, but also device information 37. The device information 37 includes information indicating the frequency that the MFP 10 is capable of using (i.e., the frequency that the wireless I/F 20 is supporting). That is, in a case where the MFP 10 is capable of using 2.4 GHz and 5.0 GHz, the device information 37 indicates 2.4 GHz and 5.0 GHz. Further, in a case where the MFP 10 is capable of using only 2.4 GHz, the device information 37 indicates only 2.4 GHz. The memory 34 comprises a setting storage area 38. In a state where the MFP 10 is belonging to a wireless NW, the setting storage area 38 stores a wireless profile to be used in the wireless NW, and channel information indicating a wireless channel value to be used in the wireless NW.

The wireless profile includes an SSID (abbreviation of Service Set Identifier), authentication scheme, encryption scheme, and password. The SSID is an identifier for identifying the wireless NW. The authentication scheme, encryption scheme, and password are information to be used in authentication and encryption in the wireless NW. The channel information indicates e.g., any value from among 1 to 13ch, or any value from among 36 to 100ch. In a wireless NW in which any of 1 to 13ch is used, a carrier wave having a frequency of 2.4 GHz is used. Further, in a wireless NW in which any of 36 to 1006 is used, a carrier wave having a frequency of 5.0 GHz is used. That is, the channel information indicates the frequency of the carrier wave used in the wireless NW.

(Configuration of PC 80)

The PC 80 comprises an operation unit 82, a display unit 84, a wireless I/F 90, a USB I/F 92, and a controller 120. The operation unit 82 is configured by a keyboard and a mouse. The user can input various instructions to the PC 80 by operating the operation unit 82. The display unit 84 is a display for displaying various pieces of information. The wireless I/F 90 is an DE which supports both the 2.4 GHz frequency and the 5.0 GHz frequency. That is, the PC 80 is capable of using both a carrier wave having a frequency of 2.4 GHz and a carrier wave having a frequency of 5.0 GHz. One end of the USB cable 4 is connected with the USB I/F 92.

The controller 120 comprises a CPU 122 and a memory 124. The CPU 122 is a processor which performs various processes in accordance with a program 126 stored in the memory 124. The memory 124 is configured by a RAM, ROM, etc. The memory 124 comprises a setting storage area 128. In a state where the PC 80 is belonging to a wireless NW, the setting storage area 128 stores a wireless profile to be used in the wireless NW, and channel information indicating a wireless channel value to be used in the wireless NW.

In the situation of FIG. 1, the PC 80, for example, belongs to a wireless NW (5.0 GHz) formed by the AP 200. In this case, the wireless profile in the setting storage area 128 includes an SSID "YYY5GHz", authentication scheme "aaa", encryption scheme "xxx", and password "ppp". Further, in the situation of FIG. 1, the channel information in the setting storage area 128 indicates any of 36 to 100ch. In other words, the channel information indicates the 5.0 GHz frequency. Moreover, below, the wireless NW to which the PC 80 belongs may be referred to as "wireless NW (PC)".

(APs 200, 300)

The AP 200 is a normal AP called a wireless AP, wireless LAN router, etc. The AP 200 is capable of using both a carrier wave having a frequency of 2.4 GHz and a carrier wave having a frequency of 5.0 GHz. The AP 200 can establish a state in which both a wireless NW (2.4 GHz) and a wireless NW (5.0 GHz) are formed simultaneously.

The AP 200 stores, a wireless profile 220 used in the wireless NW (2.4 GHz) formed by the AP 200, and channel information 222 used in the wireless NW (2.4 GHz) in association. The wireless profile 220 includes an SSID "YYY", the authentication scheme "aaa", the encryption scheme "xxx", and the password "ppp". The channel information 222 indicates any value from among 1 to 13ch. In other words, the channel information 222 indicates the 2.4 GHz frequency.

The AP 200 further stores, a wireless profile 230 used in the wireless NW (5.0 GHz) formed by the AP 200, and channel information 232 used in the wireless NW (5.0 GHz) in association. The wireless profile 230 includes an SSID "YYY5GHz", the authentication scheme "aaa", the encryption scheme "xxx", and the password "ppp". That is, the authentication scheme, the encryption scheme, and the password are in common for the two wireless profiles 220, 230. Further, the SSID "YYY" in the wireless profile 220 includes the character string "YYY" which is a part of the character string "YYY5GHz" configuring the SSID in the wireless profile 230. The channel information 232 indicates any of 36 to 100ch. In other words, the channel information 232 indicates the 5.0 GHz frequency.

The AP 300 is capable of using only a carrier wave having a frequency of 2.4 GHz, and forms a wireless NW (2.4 GHz). The AP 300 stores, a wireless profile used in the wireless NW (2.4 GHz) formed by the AP 300, and channel information used in the wireless NW (2.4 GHz) in association (these are not shown). The wireless profile includes an SSID "AAA", authentication scheme, encryption scheme, and password. The channel information indicates any value from among 1 to 13ch. In other words, the channel information indicates the 2.4 GHz frequency.

(Process Executed by PC 80; FIG. 2)

Next, contents of a process executed by the CPU 122 of the PC 80 will be described with reference to FIG. 2. The process is triggered by the user performing an operation on the operation unit 82 for supplying the wireless profile to the MFP 10 in a state where the PC 80 is belonging to a wireless NW formed by the AP 200. Moreover, the PC 80 may be belonging to a wireless NW (2.4 GHz) formed by the AP 200, and may be belonging to a wireless NW (5.0 GHz) formed by the AP 200.

In S10, the CPU 122 supplies, to the MFP 10 via the USB I/F 92, a device information request for requesting the supply of the device information 37 and, in S12, obtains the device information 37 from the MFP 10 via the USB I/F 92.

In S13, the CPU 122 obtains the wireless profile and the channel information to be used in the wireless NW (PC) (i.e., wireless NW formed by the AP 200) by reading the wireless profile and the channel information from the setting storage area 128 in the memory 124.

In S14, the CPU 122 determines whether the MFP 10 is capable of using only 2.4 GHz or not, and whether the wireless NW (PC) is a wireless NW (5.0 GHz) or not. In a case where the device information 37 obtained in S12 indicates only 2.4 GHz (i.e., does not indicate 5.0 GHz), and the channel information obtained in S13 indicates 5.0 GHz (i.e., the case where any of 36 to 100ch is indicated), the CPU 122 determines YES in S14, and proceeds to S16. On the other hand, in a case where the device information 37 obtained in S12 indicates 2.4 GHz and 5.0 GHz, the CPU 122 determines NO in S14, and proceeds to S26. That is, in the case where the MFP 10 is capable of using 5.0 GHz, the CPU 122 determines NO in S14 regardless of whether the wireless NW (PC) is a wireless NW (5.0 GHz) or not. Further, in a case where the channel information obtained in S13 indicates 2.4 GHz (i.e., the case where any of 1 to 13ch is indicated), the CPU 122 determines NO in S14, and proceeds to S26. That is, in the case where the wireless NW (PC) is the wireless NW (2.4 GHz), the CPU 122 determines NO in S14 regardless of whether the MFP 10 is capable of using 5.0 GHz or not.

In S16, the CPU 122 searches for one or more APs located in a surrounding of the PC 80 (i.e., one or more APs located in a surrounding of the MFP 10), and obtains N items of SSIDs from the one or more APs. Specifically, first, the CPU 122 sends two kinds of Probe Request signal in which a destination is not specified via the wireless I/F 90. Below, Request is referred to as "Req." One Probe Req. signal of the two kinds of Probe Req. signal is sent using a carrier wave having a frequency of 2.4 GHz. The other Probe Req. signal of the two kinds of Probe Req. signal is sent using a carrier wave having a frequency of 5.0 GHz. Below, the one Probe Req. signal and the other Probe Req. signal are referred to as Probe Req. signal (2.4 GHz) and Probe Req. signal (5.0 GHz), respectively. Further, below, for a signal other than a Probe Req. signal, also, a frequency to be used in communication of the signal may be written in parentheses.

For example, in the situation of FIG. 1, the AP 200 is forming both a wireless NW (2.4 GHz) and a wireless NW (5.0 GHz). In this case, in case of receiving a Probe Req. signal (2.4 GHz) from the PC 80, the AP 200 sends, to the PC 80, a Probe Response signal (2.4 GHz) including the channel information 222 indicating 2.4 GHz, and the SSID "YYY" in the wireless profile 220 associated with the channel information 222. Below, Response is referred to as "Res.". Further, in case of receiving a Probe Req. signal (5.0 GHz) from the PC 80, the AP 200 sends, to the PC 80, a Probe Res. signal (5.0 GHz) including the channel information 232 indicating 5.0 GHz, and the SSID "YYY5GHz" in the wireless profile 230 associated with the channel information 232. That is, in a situation where the AP 200 is forming both a wireless NW (2.4 GHz) and a wireless NW (5.0 GHz), an SSID (i.e., "YYY") for identifying the wireless NW (2.4 GHz), and an SSID (i.e., "YYY5GHz") for identifying the wireless NW (5.0 GHz), are sent from the AP 200 to the PC 80. Below, the former SSID and the latter SSID are referred to as "SSID (2.4 GHz)" and "SSID (5.0 GHz)", respectively. Moreover, in a case where the AP 200 is forming only one wireless NW from among the wireless NW (2.4 GHz) and the wireless NW (5.0 GHz), the AP 200 sends only an SSID (i.e., SSID (2.4 GHz) or SSID (5.0 GHz)), for identifying the one wireless NW, to the PC 80.

Further, e.g., in the situation of FIG. 1, the AP 300 is forming only the wireless NW (2.4 GHz). In this case, in case of receiving a Probe Req. signal (2.4 GHz) from the PC 80, the AP 300 sends, to the PC 80, a Probe Res. signal (2.4 GHz) which includes channel information indicating 2.4 GHz, and an S510 (2.4 GHz) (i.e., "AAA").

In S16, the CPU 122 obtains N items of SSIDs included in the N items of Probe Req. signals by receiving N items of Probe Req. signal from the one or more APs. For example, in the situation of FIG. 1, the CPU 122 obtains three SSIDs included in three Probe Req. signals by receiving three Probe Req. signals from the two APs 200, 300.

In S18, the CPU 122 specifies one or more SSIDs (2.4 GHz) from among the N items of SSIDs included in the N items of Probe Res. signals obtained is S16. Specifically, the CPU 122 specifies one or more Probe Res. signals which include the channel information indicating 2.4 GHz, from among the N items of Probe Res. signals obtained is S16, and specifies one or more SSIDs (2.4 GHz) included in the specified one or more Probe Res. signals. For example, in the situation of FIG. 1, the CPU 122 specifies the SSID (2.4 GHz) (i.e., "YYY") obtained from the AP 200, and the SSID (2.4 GHz) (i.e., "AAA") obtained from the AP 300. Moreover, in a case where the SSID (2.4 GHz) is not present among the N items of SSIDs (i.e., all are SSIDs (5.0 GHz)), the CPU 122 proceeds to S26 (not shown).

In S20, based on the SSID included in the wireless profile obtained in S13, i.e., the SSID used in the wireless NW (PC) to which the PC 80 is belonging (called "SSID (PC)" below), the CPU 122 determines whether an object SSID is included in the one or more SSIDs (2.4 GHz) specified in S18 or not. Although this will be described in detail later, the object SSID is an SSID which satisfies at least one condition of first to fifth conditions shown in FIG. 3. In a case where an object SSID is included in the one or more SSIDs (2.4 GHz) specified in S18 (YES in S20), the CPU 122 selects the object SSID from among the one or more SSIDs (2.4 GHz), and proceeds to S22. On the other hand, in a case where an object SSID is not included in the one or more SSIDs (2.4 GHz) specified in S18 (NO in S20), the CPU 122 proceeds to S26.

In S22, first, the CPU 122 generates a new wireless profile by using the wireless profile obtained in S13. Specifically, the CPU 122 generates a new wireless profile by substituting the object SSID selected in S20 for the SSID (PC) included in the wireless profile obtained in S13. That is, the authentication scheme, encryption scheme, and password are in common for the wireless profile obtained in S13 and the new wireless profile. Moreover, as will be described in detail later, it is possible that the SSID (PC) and the object SSID are identical. In this case, the SSIDs are also in common for the wireless profile obtained in S13 and the new wireless profile. Next, the CPU 122 supplies the new wireless profile to the MFP 10 via the USB I/F 92, for setting the new wireless profile in the MFP 10. Thereby, the MFP 10 may be able to belong to the wireless NW by using the new wireless profile. More specifically, since the object SSID included in the new wireless profile is an SSID for identifying the wireless NW (2.4 GHz), the MFP 10 may be able to belong to the wireless NW (2.4 GHz). When S22 ends, the process of FIG. 2 ends.

In S26, the CPU 122 supplies the wireless profile to the MFP 10 via the USB I/F 92 in order to set the wireless profile obtained in S13 in the MFP 10. Thereby, the MFP 10 may be able to belong to the wireless NW by using the wireless profile. More specifically, in a case where the SSID (PC) included in the wireless profile is an SSID for identifying the wireless NW (2.4 GHz), the MFP 10 may be able to belong to the wireless NW (2.4 GHz). Further, in a case where the SSID (PC) included in the wireless profile is an SSID for identifying the wireless NW (5.0 GHz), the MFP 10 may be able to belong to the wireless NW (5.0 GHz). When S26 ends, the process of FIG. 2 ends.

(Conditions for Selecting Object SSID; FIG. 3)

Next, the contents of conditions for selecting the object SSID in S20 of FIG. 2 will be described with reference to FIG. 3. Based on the SSID (PC), the CPU 122 selects, as the object SSID, one SSID which satisfies at least one condition among the first to fifth conditions below, from among the one or more SSIDs (2.4 GHz) specified in S18. The priority of the first condition is highest, and priority decreases in the order of the second to fifth conditions. That is, in a case where an SSID which satisfies the first condition is present among the one or more SSIDs (2.4 GHz), the CPU 122 selects that SSID as the object SSID. Further, in a case where an SSID which satisfies the first condition is not present, the CPU 122 selects an SSID which satisfies the second condition, as the object SSID. Similarly, in a case where an SSID which satisfies the second condition is not present, the CPU 122 selects an SSID which satisfies the third condition, as the object SSID. The same applies to the subsequent conditions.

The first to fifth conditions are conditions for selecting an object SSID for identifying a wireless NW (2.4 GHz) formed by the same AP as the AP forming the wireless NW (5.0 GHz) to which the PC 80 currently belongs. In other words, the wireless NW identified by the SSID (PC), and the wireless NW identified by the object SSID are formed by the same AP. Further, in other words, the SSID (PC) and the object SSID are set in the same AP.

In two SSIDs that are set in the same AP, it is highly likely that the entirety of one SSID and the entirety of the other SSID are identical. Consequently, the first condition is that the entirety of the SSID (2.4 GHz) is identical to the entirety of the SSID (PC). For example, in a case where the SSID (2.4 GHz) is configured by the character string "YYY", and the SSID (PC) is configured by the character string "YYY", the SSID (2.4 GHz) satisfies the first condition.

Further, in two SSIDs that are set in the same AP, it is highly likely that even if the entirety of one SSID and the entirety of the other SSID are not identical, the one SSID and the other SSID are partially identical. Consequently, the second to fifth conditions include the SSID (2.4 GHz) and the SSID (PC) being partially identical.

The second condition is that the entirety of the SSID (2.4 GHz) is identical to the character string of the SSID (PC) except for the last four characters, and the last four characters of the SSID (PC) include "5G". For example, in a case where the SSID (2.4 GHz) is configured by the character string "YYY", and the SSID (PC) is configured by the character string "YYY5GHz", the SSID (2.4 GHz) satisfies the second condition.

The third condition is that the entirety of the SSID (2.4 GHz) is identical to the character string of the SSID (PC) except for the last three characters, and the last three characters of the SSID (PC) include "5G". For example, in a case where the SSID (2.4 GHz) is configured by the character string "ZZZ", and the SSID (PC) is configured by the character string "ZZZ-5G", the SSID (2.4 GHz) satisfies the third condition. Further, e.g., in a case where the SSID (2.4 GHz) is configured by the character string "WWW", and the SSID (PC) is configured by the character string "WWW 5G", also, the SSID (2.4 GHz) satisfies the third condition.

The fourth condition is that the entirety of the SSID (2.4 GHz) is identical to the character string of the SSID (PC) except for the last two characters, and the last two characters of the SSID (PC) include "A". For example, in a case where the SSID (2.4 GHz) is configured by the character string "VVV", and the SSID (PC) is configured by the character string "VVV-A", the SSID (2.4 GHz) satisfies the fourth condition.

The fifth condition is that only one character is different between the SSID (2.4 GHz) and the SSID (PC), and the different character of the SSID (2.4 GHz) is "G" and the different character of the SSID (PC) is "A". For example, in a case where the SSID (2.4 GHz) is configured by the character string "U-G-U", and the SSID (PC) is configured by the character string "U-A-U", the SSID (2.4 GHz) satisfies the fifth condition. Further, e.g., in a case where the SSID (2.4 GHz) is configured by the character string "TTT-G", and the SSID (PC) is configured by the character string "TTT-A", the SSID (2.4 GHz) satisfies the fifth condition.

Figure 6:
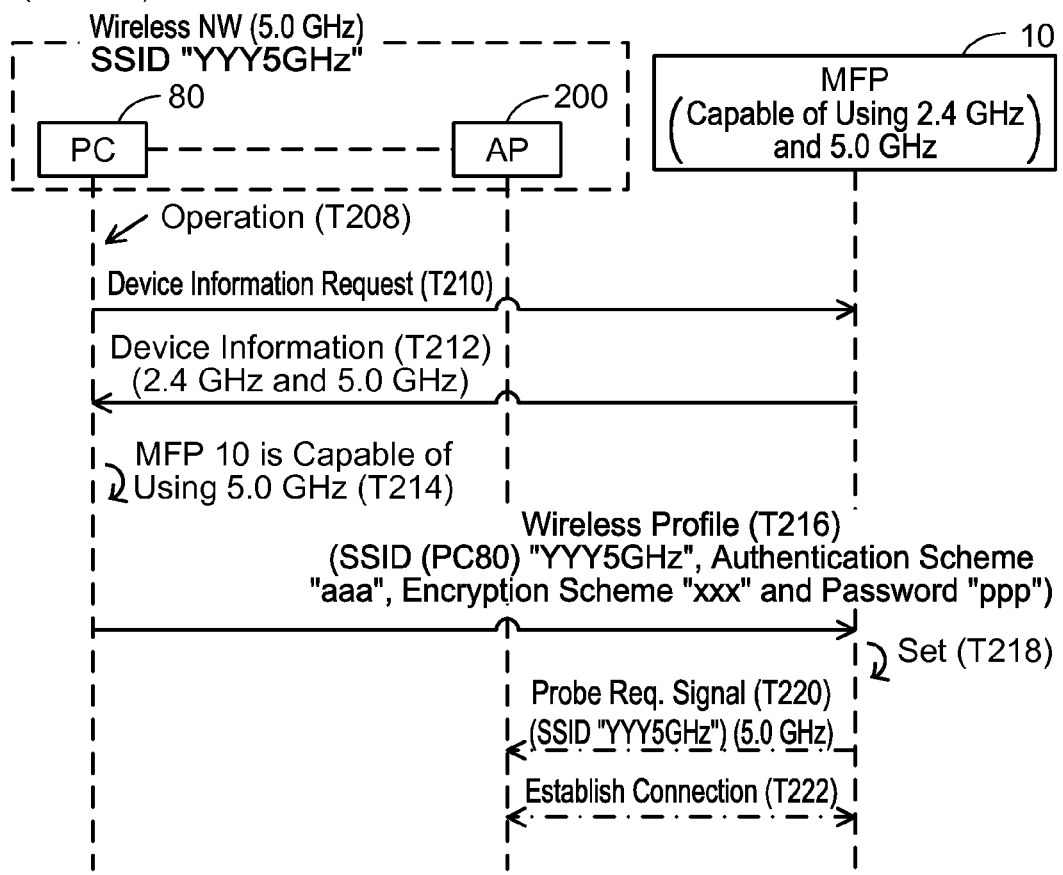
FIG. 6 shows a sequence view of a case C in which the PC does not select an object SSID.

(Specific Cases; FIG. 4 to FIG. 6)

Next, the contents of specific cases A to C implemented in accordance with the flowchart of FIG. 2 will be described with reference to FIG. 4 to FIG. 6. In FIG. 4 to FIG. 6, solid arrows indicate USB communication, and dashed arrows indicate wireless communication. This point is the same also in FIG. 9 and FIG. 10, described later.

(Case A; FIG. 4)

In the present case, the PC 80 is belonging to a wireless NW (5.0 GHz) formed by the AP 200, and is storing a wireless profile which includes the SSID "YYY5GHz". Further, the MFP 10 is capable of using only 2.4 GHz.

In T8, the user performs an operation on the PC 80 for supplying the wireless profile to the MFP 10 (the trigger of FIG. 2). In this case, in T10, the PC 80 supplies a device information request to the MFP 10 via the USB I/F 92 (S10) and, in T12, obtains the device information 37 from the MFP 10 via the USB I/F 92 (S12). The device information 37 indicates only 2.4 GHz. In T14, the PC 80 determines that the MFP 10 is capable of using only 2.4 GHz, and that the wireless NW (PC) is the wireless NW (5.0 GHz) (YES in S14).

In T16, the PC 80 sends a Probe Req. signal (2.4 GHz) and a Probe Req. signal (5.0 GHz) via the wireless I/F 90 (S16). In T17, T18, the PC 80 receives a Probe Res. signal (2.4 GHz) including the SSID "YYY", and a Probe Res. signal (5.0 GHz) including the SSID "YYY5GHz" from the AP 200 via the wireless I/F 90. In T19, the PC 80 obtains a Probe Res. signal (2.4 GHz) including the SSID "AAA" from the AP 300 via the wireless IT 90.

In T20, the PC 80 specifies the two SSIDs "YYY", "AAA", which are SSIDs (2.4 GHz), from among the three SSIDs "YYY", "YYY5GHz" and "AAA" (S18). In T22, based on the SSID (PC) (i.e., SSID "YYY5GHz"), the PC 80 selects, as the object SSID, the SSID "YYY" which satisfies the second condition of FIG. 3 from among the two SSIDs "YYY", "AAA" (YES in S20). In T24, the PC 80 supplies the wireless profile to the MFP 10 via the USB I/F 92 (S22). The wireless profile includes the SSID "YYY" selected in T22, and the information in the setting storage area 128 (i.e., the authentication scheme "aaa", the encryption scheme "xxx", the password "ppp"). The wireless profile is the same as the wireless profile 220 used in the wireless NW (2.4 GHz) formed by the AP 200 (see FIG. 1).

In T26, the MFP 10 sets the wireless profile by storing the wireless profile of T24 in the setting storage area 38. In T28, the MFP 10 sends a Probe Req. signal which includes the SSID "YYY" to the AP 200 via the wireless I/F 20. Moreover, since the MFP 10 is capable of using only 2.4 GHz, the Probe Req. signal is sent using a carrier wave having 2.4 GHz. In T30, the MFP 10 executes the communication of a Probe Res. signal (2.4 GHz), Authentication Req./Res. signal (2.4 GHz), and Association Req./Res. signal (2.4 GHz) with the AP 200 via the wireless I/F 20. Thereby, the MFP 10 can belong to the wireless NW (2.4 GHz) formed by the AP 200.

At the point where 130 ends, the PC 80 is belonging to the wireless NW (5.0 GHz) formed by the AP 200, and the MFP 10 is belonging to the wireless NW (2.4 GHz) formed by the AP 200. That is, the PC 80 and the MFP 10 are connected with the same AP 200. In this state, the following communication can be executed. For example, the PC 80 sends an image file to the AP 200 by using the wireless NW (5.0 GHz). The MFP 10 can receive the image file from the AP 200 by using the wireless NW (24 GHz), and can execute a print of the image represented by the image file. Further, e.g., the MFP 10 can generate scan data by performing a scan of a document, and send the scan data to the AP 200 by using the wireless NW (2.4 GHz). The PC 80 receives the scan data from the AP 200 by using the wireless NW (5.0 GHz). That is, although the PC 80 and the MFP 10 belong to different wireless NWs, the PC 80 and the MFP 10 are connected with the same AP 200, and consequently the PC 80 and the MFP 10 can execute a wireless communication via the AP 200.

(Effect of Case A)

As described above, in case A, a situation is assumed in which the wireless NW (PC) is the wireless NW (5.0 GHz), and the MFP 10 is capable of using only 2.4 GHz. In this type of situation, since the MFP 10 is not capable of using 5.0 GHz, the MFP 10 cannot belong to the wireless NW (PC) even if the SSID "YYY5GHz" used in the wireless NW (PC) is obtained from the PC 80, and is not capable of executing a wireless communication using the wireless NW (PC). Therefore, the PC 80 searches for one or more APs, obtains three SSIDs (T16 to T19), selects the SSID "YYY" used in the wireless NW (2.4 GHz) formed by the AP 200 (T22), and supplies a wireless profile which includes the SSID "YYY" to the MFP 10 (T24) in order to set the wireless profile which includes the SSID "YYY" in the MFP 10. Consequently, the MFP 10 can belong to the wireless NW (2.4 GHz) formed by the AP 200 (T26 to T30), and can execute a wireless communication using the wireless NW (2.4 GHz). In particular, the MFP 10 can execute a wireless communication with the PC 80 via the AP 200 by using the wireless NW (2.4 GHz), Thus, according to the present embodiment, it is possible to appropriately cause the MFP 10 to execute a wireless communication using the wireless NW.

(Case B; FIG. 5)

In the present case, the PC 80 is belonging to a wireless NW (2.4 GHz) formed by the AP 200, and is storing a wireless profile which includes the SSID "YYY". Further, the MFP 10 is capable of using only 2.4 GHz.

T108 to T112 are the same as T8 to T12 of FIG. 4. In T114, the PC 80 determines that the wireless NW (PC) is the wireless NW (2.4 GHz) (NO in S14 of FIG. 2). In T116, the PC 80 supplies the wireless profile to the MFP 10 via the USB I/F 92 (S26). The wireless profile is the same as the wireless profile in the setting storage area 128 (i.e., the SSID "YYY", the authentication scheme "aaa", the encryption scheme "xxx", the password "ppp"). Further, the wireless profile is the same as the wireless profile used in the wireless NW (PC), i.e., the wireless profile 220 used in the wireless NW (2.4 GHz) formed by the AP 200 (see FIG. 1). T118 to T122 are the same as T26 to T30 of FIG. 4. Thereby, the MFP 10 can belong to the wireless NW (2.4 GHz) formed by the AP 200.

At the point where T122 has ended, the PC 80 and the MFP 10 are belonging to the wireless NW (2.4 GHz) formed by the AP 200. In this state, the PC 80 and the MFP 10 can execute a wireless communication of an image file, scan data, etc. via the AP 200 by using the wireless NW (2.4 GHz).

(Effect of Case B)

As described above, in the case where the wireless NW (PC) is the wireless NW (2.4 GHz), the PC 80 does not search for an AP regardless of the frequency that the MFP 10 is capable of using. In order to set a wireless profile which includes the SSID (PC) in the MFP 10, the PC 80 supplies a wireless profile which includes the SSID (PC) to the MFP 10 (T116). Consequently, the MFP 10 can belong to a wireless NW (2.4 GHz) formed by the AP 200, and can execute a wireless communication by using the wireless NW (2.4 GHz). In particular, the MFP 10 can execute a wireless communication with the PC 80 via the AP 200 by using the wireless NW (2.4 GHz). In the present case, also, it is possible to appropriately cause the MFP 10 to execute a wireless communication using the wireless NW.

(Case C; FIG. 6)

In the present case, the PC 80 is belonging to a wireless NW (5.0 GHz) formed by the AP 200, and is storing a wireless profile which includes the SSID "YYY5GHz". Further, the MFP 10 is capable of using 2.4 GHz and 5.0 GHz.

T208 to T212 are the same as 18 to T12 of FIG. 4. However, the device information 37 of T212 indicates 2.4 GHz and 5.0 GHz. In T214, the PC 80 determines that the MFP 10 is capable of using 5.0 GHz (NO in S14 of FIG. 2). In T216, the PC 80 supplies the wireless profile to the MFP 10 via the USB I/F 92 (S26). The wireless profile is the same as the wireless profile in the setting storage area 128 (i.e., the SSID "YYY5GHz", the authentication scheme "aaa", the encryption scheme "xxx", the password "ppp"). Further, the wireless profile is the same as the wireless profile used in the wireless NW (PC), i.e., the wireless profile 230 used in the wireless NW (5.0 GHz) formed by the AP 200 (see FIG. 1).

In T218, the MFP 10 sets the wireless profile in the MFP 10 and, in T220, sends a Probe Req. signal which includes the SSID "YYY5GHz" to the AP 200. Moreover, the MFP 10 cannot know if the wireless profile of T24 is to be used in the wireless NW (2.4 GHz) or is to be used in the wireless NW (5.0 GHz). Consequently, in T220, the MFP 10 sends both a Probe Req. signal (2.4 GHz) which includes the SSID "YYY5GHz", and a Probe Req. signal (5.0 GHz) which includes the SSID "YYY5GHz" to the AP 200. Moreover, the Probe Req. signal (2.4 GHz) is not shown in the figure. The AP 200 sends, to the MFP 10, a Probe Res. signal (5.0 GHz) which is a response to the Probe Req. signal (5.0 GHz) and does not send a Probe Res. signal (2.4 GHz) which is a response to the Probe Req. signal (2.4 GHz). In T222, the MFP 10 performs a communication of the Probe Res. signal (5.0 GHz), Authentication Req./Res. signal (5.0 GHz), and Association Req./Res. signal (5.0 GHz) with the AP 200. Thereby, the MFP 10 can belong to the wireless NW (5.0 GHz) formed by the AP 200.

At the point where T222 has ended, the PC 80 and the MFP 10 belong to the wireless NW (5.0 GHz) formed by the AP 200. In this state, the PC 80 and the MFP 10 can execute a wireless communication of an image file, scan data, etc. via the AP 200 by using the wireless NW (5.0 GHz).

(Effect of Case C)

As described above, in a case where the MFP 10 is capable of using 5.0 GHz, the PC 80 does not search for an AP regardless of whether the wireless NW (PC) is a wireless NW (2.4 GHz) or a wireless NW (5.0 GHz). In order to set the wireless profile which includes the SSID (PC) in the MFP 10, the PC 80 supplies the wireless profile which includes the SSID (PC) to the MFP 10 (T216). Consequently, the MFP 10 can belong to the wireless NW (5.0 GHz) formed by the AP 200, and can execute a wireless communication by using the wireless NW (5.0 GHz). In particular, the MFP 10 can execute a wireless communication with the PC 80 via the AP 200 by using the wireless NW (5.0 GHz). In the present case, also, it is possible to appropriately cause the MFP 10 to execute a wireless communication using the wireless NW.

Moreover, in the specific cases A to C above, a case in which NO is determined in S20 of FIG. 2 is not described. In this case, the wireless profile used in the wireless NW (5.0 GHz) to which the PC 80 is belonging is supplied to the MFP 10 (S26) even though the MFP 10 is not capable of using 5.0 GHz (YES in S14). Consequently, the MFP 10 cannot belong to the wireless NW (5.0 GHz) by using the wireless profile. In this case, the MFP 10 displays a message indicating that MFP 10 cannot belong to the wireless NW. Moreover, in a variant, when NO is determined in S20, information may be supplied to the MFP 10 for instructing the display of the above message without proceeding to S26.

(Correspondence Relationship)

The controller 120 of the PC 80, the PC 80, and the MFP 10 are examples of "controlling device", "set device" and "unset device", respectively. The APs 200, 300 are an example of "one or more access points". The AP 200 is an example of "target access point". The MFP 10 of cases A, B of FIGS. 4, 5 is an example of "first type of device". The MFP 10 of case C of FIG. 6 is an example of "second type of device". The wireless NW (5.0 GHz) and the wireless NW (2.4 GHz) are examples of "first type of network" and "second type of network", respectively. The device information 37 is an example of "first particular information". 5.0 GHz and 2.4 GHz are examples of "first frequency" and "second frequency", respectively. The wireless NW (PC) of cases A to C of FIGS. 4 to 6 is an example of "first wireless network". In case A of FIG. 4, the wireless NW (2.4 GHz) formed by the AP 200 is an example of "second wireless network".

The three SSIDs obtained in T17 to T19 of case A of FIG. 4 are an example of "N items of wireless identifiers". The SSID (PC) and the object SSID are examples of "first wireless identifier" and "second wireless identifier", respectively. The SSID "YYY" and the SSID "AAA" specified in T20 of case A of FIG. 4 are examples of "one or more wireless identifiers". In FIG. 3, the character strings configuring the SSID (PC) (e.g., "YYY", "YYY5GHz", etc.) are examples of "particular character string".

In FIG. 2, S12, S13, S16, S20 are examples of "obtaining the particular information", "obtaining the first wireless identifier", "searching" and "selecting", respectively. S22, S26 are examples of "first setting process" and "second setting process", respectively.

Second Embodiment

In the first embodiment, the PC 80 executes a search for an AP (S16 of FIG. 2) whereas, in the present embodiment, the MFP 10 executes the search for an AP. As shown in FIG. 1, the present embodiment, the memory 124 of the PC 80 further stores flag information 134. The flag information 134 is information indicating whether the MFP 10 is to execute a search for the AP or not.

(Process of PC; FIG. 7)

In the present embodiment, the CPU 122 of the PC 80 executes the process of FIG. 7 instead of the process of FIG. 2. The start trigger of the process of FIG. 7, S110, S112 and S114 are the same as the start trigger of the process of FIG. 2, S10, S12 and S14, respectively.

In S116, the CPU 122 stores the flag information 134 indicating ON in the memory 124. On the other hand, in S118, the CPU 122 stores the flag information 134 indicating OFF in the memory 124. When S116 or S118 ends, the process proceeds to S120.

In S120, the CPU 122 reads the wireless profile from the setting storage area 128 in the memory 124, and supplies the wireless profile and the flag information 134 to the MFP 10 via the USB I/F 92. When S120 ends, the process of FIG. 7 ends.

(Process of MFP 10; FIG. 8)

Next, the contents of the process executed by the CPU 32 of the MFP 10 will be described with reference to FIG. 8. In S208, the CPU 32 obtains the wireless profile and the flag information from the PC 80 via the USB I/F 22.

In S210, the CPU 32 determines whether the flag information obtained in S208 is ON or not. In case of determining that the flag information is ON (YES in S210), the CPU 32 proceeds to S212. On the other hand, in case of determining that the flag information is OFF (NO in S210), the CPU 32 proceeds to S220.

S212 is the same as S16 of FIG. 2. However, since the MFP 10 is not capable of using 5.0 GHz (YES in S114 of FIG. 7, YES in S210), the CPU 32 sends only one type of Probe Req. signal (2.4 GHz). In case of receiving the Probe Req. signal (2.4 GHz) from the MFP 10, each AP sends a Probe Res. signal (2.4 GHz) which includes SSID (2.4 GHz) and channel information to the MFP 10.

In S216, the CPU 32 determines whether an object SSID is included in the one or more SSIDs (2.4 GHz) obtained in S212 or not. S216 is the same as S20 of FIG. 2. The CPU 32 proceeds to S218 in case of determining that an object SSID is included (YES in S216), and proceeds to S222 in case of determining that an object SSID is not included (NO in S216).

In S218, first, the CPU 32 generates a new wireless profile by using the wireless profile obtained in S208. Specifically, the CPU 32 generates the new wireless profile by substituting the object SSID selected in S216 for the SSID (PC) included in the wireless profile obtained in S208. The CPU 32 sets the new wireless profile in the MFP 10 by storing the new wireless profile in the setting storage area 38 in the memory 34.

In S219, the CPU 32 establishes a wireless connection with the AP 200 by using the wireless profile set in S218. Specifically, the CPU 32 sends a Probe Req. signal which includes the object SSID (2.4 GHz) to the AP 200. Next, the MFP 10 performs a communication with the AP 200 of the Probe Res. signal (2.4 GHz), Authentication Req./Res. signal (2.4 GHz), and Association Req./Res. signal (2.4 GHz). Thereby, the MFP 10 can belong to the wireless NW (2.4 GHz) formed by the AP 200. When S219 ends, the process of FIG. 8 ends.

On the other hand, in S220, the CPU 32 sets the wireless profile in the MFP 10 by storing the wireless profile obtained in S208 in the setting storage area 38 in the memory 34.

In S221, the CPU 32 establishes a wireless connection with the AP 200 by using the wireless profile set in S220. S221 is the same as S219. In a case where the SSID (PC) included in the wireless profile set in S220 is an SSID for identifying a wireless NW (2.4 GHz), the MFP 10 can belong to the wireless NW (2.4 GHz). Further, in a case where the SSID (PC) included in the wireless profile set in S220 is an SSID for identifying a wireless NW (5.0 GHz), the MFP 10 can belong to the wireless NW (5.0 GHz). When S221 ends, the process of FIG. 8 ends.

In S222, the CPU 32 displays a message indicating that MFP 10 cannot belong to the wireless NW. Moreover, in a variant, in S222 the CPU 32 may display a selection screen which includes the one or more SSIDs (2.4 GHz) obtained in S212. Thereby, the user can select, in the selection screen, one SSID from among the one or more SSIDs (2.4 GHz).

(Specific Cases; FIG. 9, FIG. 10)

Next, the contents of specific cases D, E implemented in accordance with the flowcharts of FIG. 7 and FIG. 8 will be described with reference to FIG. 9 and FIG. 10.

(Case D; FIG. 9)

In the present case, the PC 80 is belonging to a wireless NW (5.0 GHz) formed by the AP 200, and is storing a wireless profile which includes the SSID "YYY5GHz". Further, the MFP 10 is capable of using only 2.4 GHz T308 to T314 are the same as 18 to T14 of FIG. 4 (S110, S112, YES in S114 of FIG. 7). In T316, the PC 80 sets the flag information 134 to ON (S116 of FIG. 7) and, in T318, supplies the wireless profile and the flag information 134 indicating "ON" to the MFP 10 (S120). The wireless profile includes the SSID "YYY5GHz", the authentication scheme "aaa", the encryption scheme "xxx", and the password "ppp".

In case of obtaining the wireless profile and the flag information 134 indicating "ON" from the PC 80 (S208 of FIG. 8), in T320, the MFP 10 sends a Probe Req. signal (2.4 GHz) (YES in S210, S212). In T322, the MFP 10 receives a Probe Res. signal (2.4 GHz) including the SSID "YYY" from the AP 200. In T323, the MFP 10 receives a Probe Res. signal (2.4 GHz) including the SSID "AAA" from the AP 300.

In T324, based on the SSID (PC) (i.e., SSID "YYY5GHz"), the MFP 10 selects, from among the two SSIDs "YYY", "AAA" obtained in T322 and 1323, the SSID "YYY" which satisfies the second condition as the object SSID (YES in S216). In T326, the MFP 10 sets the wireless profile (S218). T328, T330 are the same as T28, T30 of FIG. 4 (S219).

(Effect of Case D)

As described above, in case D a situation is assumed in which the wireless NW (PC) is the wireless NW (5.0 GHz), and the MFP 10 is capable of using only 2.4 GHz. In this type of situation, since the MFP 10 is not capable of using 5.0 GHz, the MFP 10 cannot belong to the wireless NW (PC) even using the wireless profile used in the wireless NW (PC), and is not capable of executing a wireless communication using the wireless NW (PC). Therefore, the MFP 10 searches for one or more APs, obtains two SSIDs (T320 to T323), selects the SSID "YYY" used in the wireless NW (2.4 GHz) formed by the AP 200 (T324), and sets a wireless profile which includes the SSM "YYY" in the MFP 10 (T326). Consequently, the MFP 10 can belong to the wireless NW (2.4 GHz) formed by the AP 200 (T328 and T330), and can execute a wireless communication using the wireless NW (2.4 GHz). In particular, the MFP 10 can execute a wireless communication with the PC 80 via the AP 200 by using the wireless NW (2.4 GHz), Thus, in the present embodiment, also, it is possible to appropriately cause the MFP 10 to execute a wireless communication using the wireless NW.

(Case E)

In the present case, the PC 80 is belonging to a wireless NW (2.4 GHz) formed by the AP 200, and is storing a wireless profile which includes the SSID "YYY". Further, the MFP 10 is capable of using only 2.4 GHz.

T408 to T412 are the same as T308 to T312 of FIG. 9. In T414, the PC 80 determines that the wireless NW (PC) is not a wireless NW (5.0 GHz) (NO in S114 of FIG. 7), in T416 sets the flag information to OFF (S118) and, in T418 supplies the wireless profile and the flag information 134 indicating "OFF" to the MFP 10 (S120). The wireless profile includes the SSID "YYY", the authentication scheme "aaa", the encryption scheme "xxx", and the password "ppp".

In case of obtaining the wireless profile and the flag information 134 indicating "OFF" from the PC 80 (S208 of FIG. 8), the MFP 10 sets the wireless profile in T420 without executing a search for an AP (NO in S210, S220). T422 and T424 are the same as 1328 and 1330 of FIG. 9.

(Effect of Case E)

As described above, in the case where the wireless NW (PC) is the wireless NW (2.4 GHz), regardless of the frequency that the MFP 10 is capable of using, the MFP 10 sets a wireless profile which includes the SSID (PC) without executing a search for an AP. Consequently, the MFP 10 can belong to the wireless NW (2.4 GHz) formed by the AP 200, and can execute a wireless communication by using the wireless NW (2.4 GHz). In particular, the MFP 10 can execute a wireless communication with the PC 80 via the AP 200 by using the wireless NW (2.4 GHz). In the present case, also, it is possible to appropriately cause the MFP 10 to execute a wireless communication using the wireless NW.

Moreover, although not shown, in a case where the MFP 10 is capable of using 5.0 GHz, regardless of whether the wireless NW (PC) is a wireless NW (2.4 GHz) or a wireless NW (5.0 GHz), the MFP 10 sets the wireless profile which includes the SSID (PC) (S220) without executing a search for an AP (NO in S210 of FIG. 8). Consequently, the MFP 10 can belong to a wireless NW (2.4 GHz) or wireless NW (5.0 GHz) formed by the AP 200, and can execute a wireless communication by using the wireless NW.

(Correspondence Relationship)

The controller 30 of the MFP 10, the PC 80, and the MFP 10 are examples of "controlling device", "set device" and "unset device", respectively. The MFP 10 of cases D, E of FIGS. 9, 10 is an example of "first type of device". The wireless NW (PC) of cases D, E of FIGS. 9, 10 is an example of "first wireless network". In case D of FIG. 9, the wireless NW (2.4 GHz) formed by the AP 200 is an example of "second wireless network". The two SSIDs obtained in T322, T323 of case D of FIG. 9 are examples of "N items of wireless identifiers" and "one or more wireless identifier". The setting storage area 38 and the flag information 134 are examples of "predetermined storage area" and "second particular information", respectively.

S208, S212, S216 of FIG. 8 are examples of "obtaining the first wireless identifier", "searching" and "selecting", respectively. S218, S220 are examples of "first setting process" and "second setting process", respectively.

(Modification 1) In the above embodiments, the MFP 10 may be present that is capable of using only 5.0 GHz. In the present modification, in S14 of FIG. 2 the CPU 122 of the PC 80 determines whether the MFP 10 is capable of using only 5.0 GHz or not, and whether the wireless NW (PC) is the wireless NW (2.4 GHz) or not. In S18, the CPU 122 specifies one or more SSIDs (5.0 GHz) from among the N items of SSIDs obtained in S16. In S20, based on the SSID (PC), the CPU 122 determines whether an object SSID is included in the one or more SSIDs (5.0 GHz) specified in S18 or not. Moreover, in the present modification, conditions for the SSID (5.0 GHz) being selected as the object SSID are the conditions of the first to fifth conditions of FIG. 3, but in which the SSID (2.4 GHz) and SSID (PC) are replaced by the SSID (PC) and SSID (5.0 GHz), respectively. In the present modification, 2.4 GHz and 5.0 GHz are "first frequency" and "second frequency", respectively. Generally speaking, "second frequency" may be any frequency different from "first frequency".

(Modification 2) In case A of FIG. 4, the AP 200 is forming both the wireless NW (2.4 GHz) and the wireless NW (5.0 GHz). However, the AP 200 may form only the wireless NW (5.0 GHz), and not form the wireless NW (2.4 GHz). In the present modification, a specific AP different from the AP 200 forms the wireless NW (2.4 GHz). A wireless profile which includes the SSID "YYY", the authentication scheme "aaa", the encryption scheme "xxx", and the password "ppp" is used in the wireless NW (2.4 GHz). In the present modification, in T17, the PC 80 obtains a Probe Res. signal (2.4 GHz) including the SSID "YYY" from the specific AP. Further, in T28, the MFP 10 sends a Probe Req. signal (2.4 GHz) which includes the SSID "YYY" to the specific AP, in T30, executes a communication of the Probe Res. signal (2.4 GHz), etc. with the specific AP, and belongs to the wireless NW (2.4 GHz) formed by the specific AP. That is, "second wireless identifier" may not be a wireless identifier used by "target access point".

(Modification 3) In the first embodiment, in S12 of FIG. 2 the CPU 122 of the PC 80 obtains the device information 37 from the MFP 10. Instead e.g., the CPU 122 may obtain a model name of the MFP 10 from the MFP 10, supply the model name to a server, not shown, via the Internet, and obtain information from the server indicating that the MFP is capable of using only 2.4 GHz, or is capable of using both 2.4 GHz and 5.0 GHz. That is, "controlling apparatus" may not perform obtaining first particular information.

(Modification 4) In the second embodiment, in S120 of FIG. 7 the CPU 122 of the PC 80 supplies the flag information 134 to the MFP 10. Instead, in a case where the flag information 134 is set to ON (S116), in S120 the CPU 122 may supply a search instruction, indicating that an AP is to be searched for, to the MFP 10. On the other hand, in a case where the flag information 134 is set to OFF (S118), the CPU 122 may not supply a search instruction to the MFP 10. In S208 of FIG. 8, the CPU 32 of the MFP 10 may determine YES in S210 in case of obtaining the search instruction from the PC 80, and may determine NO in S210 in case of not obtaining the search instruction from the PC 80. In the present modification, the search instruction is an example of "second particular information".

Further, in another variant, in S120 of FIG. 7 the CPU 122 of the PC 80 may supply the channel information stored in the memory 124 to the MFP 10. Based on the channel information obtained from the PC 80 and the device information 37 read from the memory 34, the CPU 32 of the MFP 10 may perform the same process as S114 of FIG. 7 instead of S210 of FIG. 8. That is, the CPU 32 may determine whether the MFP 10 is capable of using only 2.4 GHz or not, and whether the wireless NW (PC) is the wireless NW (5.0 GHz) or not. In a case where the read device information 37 indicates only 2.4 GHz (i.e., does not indicate 5.0 GHz), and the obtained channel information indicates 5.0 GHz (i.e., in case of indicating any of 36 to 100ch), the CPU 32 executes a search for an AP (S212). That is, the channel information indicating 5.0 GHz (i.e., the channel information indicating any of 36 to 100ch) is an example of "second particular information".

(Modification 5) "Unset device" is not restricted to the MFP 10 that is capable of performing the print function and the scan function. "Unset device" may be a device (e.g., PC, server, portable terminal (mobile telephone, smartphone, PDA, etc.)) which realizes a function (e.g., an image display function, a data calculation function) different from the print function and the scan function. Further, in the embodiments described above, "set device" is not restricted to the PC 80, but may be a server, portable terminal, MFP, etc. That is, "unset device" and "set device" include all devices capable of belonging to a wireless network.

(Modification 6) In the embodiments described above, the CPU 122 of the PC 80 or the CPU 32 of the MFP 10 implement each process in FIG. 2, FIG. 7, and FIG. 8 by executing programs (i.e., software). Instead, at least one process of each process in FIG. 2, FIG. 7, and FIG. 8 may be implemented by hardware such as a logic circuit.

What is claimed is:

1. A controlling apparatus for controlling an unset device in which any of SSIDs for identifying wireless networks have not been set, the controlling apparatus comprising:
a processor; and
a memory storing computer-readable instructions therein, the computer-readable instructions, when executed by the processor, causing the controlling apparatus to perform:
searching for one or more access points located in a surrounding of the controlling apparatus so as to obtain N items (the N being an integer equal to or more than 1) of SSIDs used by the one or more access points, in a case where a first wireless network to which a set device belongs is a first type of network and the unset device is a first type of device, a first SSID having been set in the set device, the N items of SSIDs including one or more SSIDs each for identifying a second type of network, a first carrier wave having a first frequency used in the first type of network, a second carrier wave having a second frequency different from the first frequency used in the second type of network, and the first type of device not capable of using the first carrier wave and capable of using the second carrier wave;

obtaining, from a memory of the set device, the first SSID for identifying the first wireless network to which the set device belongs;

selecting, based on the first SSID corresponding to the first carrier wave, a second SSID corresponding to the second carrier wave from among the one or more SSIDs, the second SSID being an SSID to be set in the unset device which is the first type of device not capable of using the first carrier wave and capable of using the second carrier wave, an entirety of the first SSID being configured of a particular character string, the second SSID including at least a part of the particular character string; and executing a first setting process for setting the second SSID in the unset device in order to cause the unset device to belong to a second wireless network identified by the second SSID, in a case where the second SSID is selected.

2. The controlling apparatus as in claim 1, wherein the selecting includes selecting, based on the first SSID used by a target access point which is forming the first wireless network, the second SSID used by the target access point from among the one or more SSIDs.

3. The controlling apparatus as in claim 1, wherein the searching is not performed, regardless of whether the unset device is the first type of device or not, in a case where the first wireless network to which the set device belongs is the second type of network, and the computer-readable instructions, when executed by the processor, cause the controlling apparatus to further perform:

executing a second setting process for setting the first SSID in the unset device in order to cause the unset device to belong to the first wireless network, in the case where the first wireless network to which the set device belongs is the second type of network.

4. The controlling apparatus as in claim 1, wherein the searching is not performed, regardless of whether the first wireless network to which the set device belongs is the first type of network or not, in a case where the unset device is a second type of device, the second type of device being capable of using both the first carrier wave having the first frequency and the second carrier wave having the second frequency, and the computer-readable instructions, when executed by the processor, cause the controlling apparatus to further perform:

executing a second setting process for setting the first SSID in the unset device in order to cause the unset device to belong to the first wireless network, in the case where the unset device is the second type of device.

5. The controlling apparatus as in claim wherein an entirety of the second SSID is configured of a character string identical to the particular character string.

6. The controlling apparatus as in claim 1, wherein the controlling apparatus is mounted on the set device, and in the case where the second SSID is selected, the executing of the first setting process is performed by supplying the second SSID to the unset device by executing a communication with the unset device.

7. The controlling apparatus as in claim 6, wherein the computer-readable instructions, when executed by the processor, cause the controlling apparatus to further perform:

obtaining, from the unset device by executing a communication with the unset device, first particular information indicating whether the unset device is the first type of device or not, and performing the searching, in a case where the first wireless network to which the set device belongs is the first type of network and the first particular information indicates that the unset device is the first type of device.

8. The controlling apparatus as in claim 1, wherein the controlling apparatus is mounted on the unset device, the obtaining of the first SSID is performed by executing a communication with the set device, and the executing of the first setting process is performed by storing the second SSID in a predetermined storage area in a memory of the unset device.

9. The controlling apparatus as in claim 8, wherein the searching is performed, in a case where second particular information is obtained from the set device together with the first SSID, and the unset device is the first type of device, the second particular information indicating that the searching is to be performed.

10. A non-transitory computer-readable storage medium storing computer-readable instructions for a controlling apparatus for controlling an unset device in which any of SSIDs for identifying wireless networks have not been set, wherein the computer-readable instructions, when executed by a processor of the controlling apparatus, cause the controlling apparatus to perform:

searching for one or more access points located in a surrounding of the controlling apparatus so as to obtain N items (the N being an integer equal to or more than 1) of SSIDs used by the one or more access points, in a case where a first wireless network to which a set device belongs is a first type of network and the unset device is a first type of device, a first SSID having been set in the set device, the N items of SSIDs including one or more SSIDs each for identifying a second type of network, a first carrier wave having a first frequency used in the first type of network, a second carrier wave having a second frequency different from the first frequency used in the second type of network, and the first type of device not capable of using the first carrier wave and capable of using the second carrier wave;

obtaining, from a memory of the set device, the first SSID for identifying the first wireless network to which the set device belongs;

selecting, based on the first SSID corresponding to the first carrier wave, a second SSID corresponding to the second carrier wave from among the one or more SSIDs, the second SSID being an SSID to be set in the unset device which is the first type of device not capable of using the first carrier wave and capable of using the second carrier wave, an entirety of the first SSID being configured of a particular character string, the second SSID including at least a part of the particular character string; and executing a first setting process for setting the second SSID in the unset device in order to cause the unset device to belong to a second wireless network identified by the second SSID, in a case where the second SSID is selected.

* * * * *

UNITED STATES PATENT AND TRADEMARK OFFICE
CERTIFICATE OF CORRECTION

PATENT NO.         : 9,596,365 B2                              Page 1 of 1
APPLICATION NO.    : 14/868483
DATED              : March 14, 2017
INVENTOR(S)        : Akiko Abe It is certified that error appears in the above-identified patent and that said Letters Patent is hereby corrected as shown below:

In Column 17, Claim 5, Line 56:
Please insert --1,-- after "claim"

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*